Sept. 24, 1935.　　L. HIRSCHHORN ET AL　　2,015,071
COMBINATION BAG FILLING MECHANISM
Filed June 24, 1932　　9 Sheets-Sheet 1

INVENTORS
LOUIS HIRSCHHORN and HANS IRMSCHER
BY
ATTORNEYS

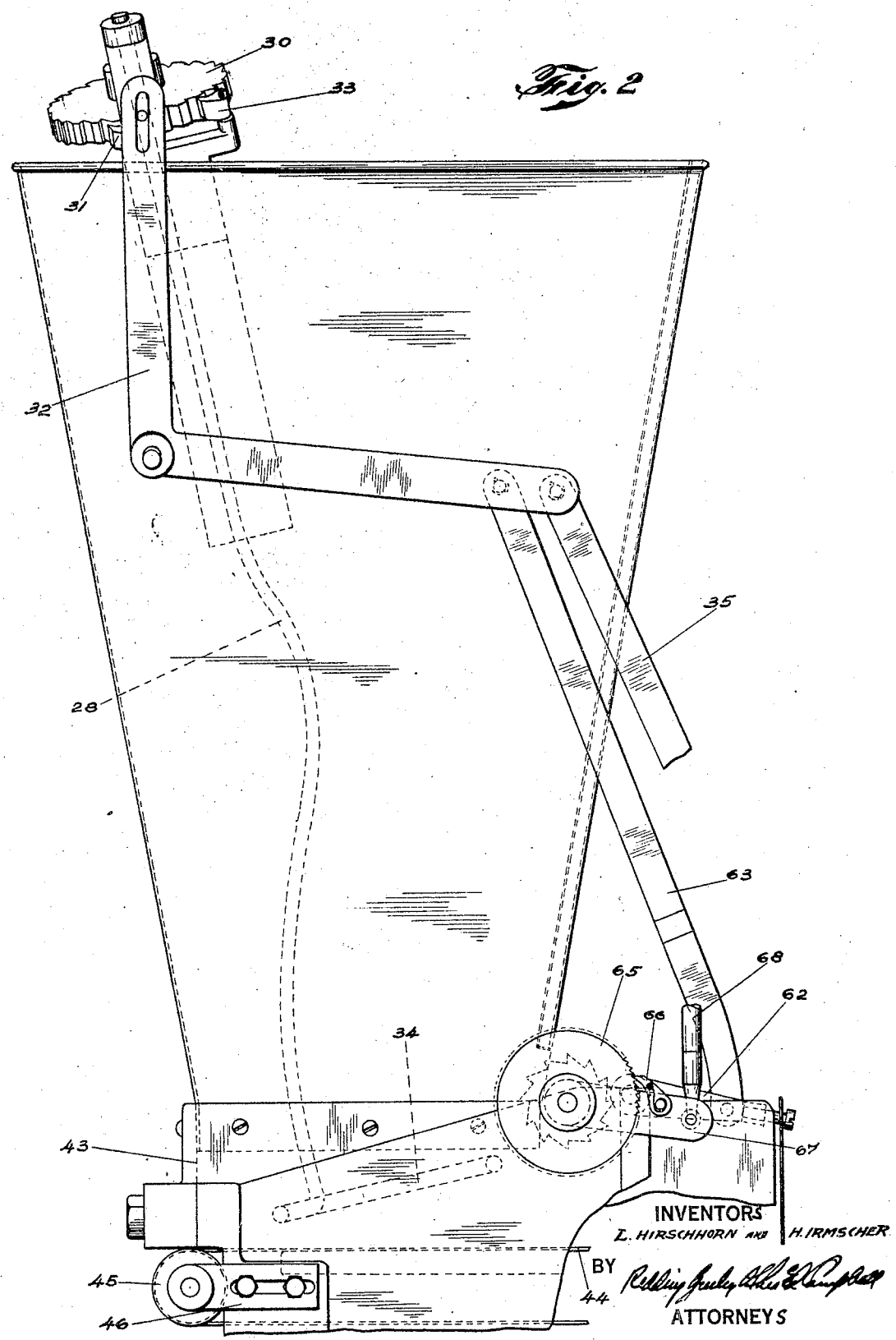

Sept. 24, 1935.  L. HIRSCHHORN ET AL  2,015,071
COMBINATION BAG FILLING MECHANISM
Filed June 24, 1932   9 Sheets-Sheet 3
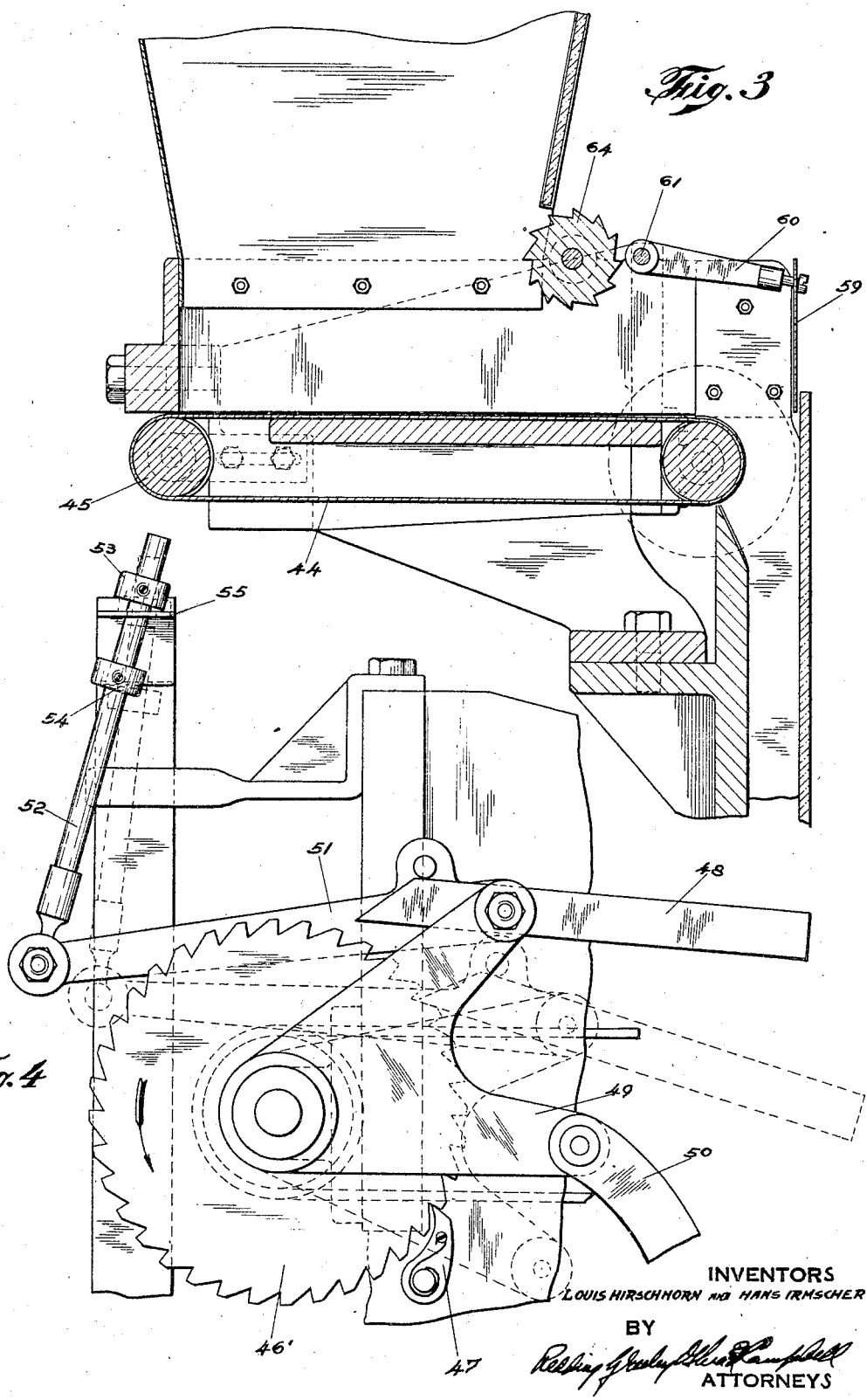
INVENTORS
LOUIS HIRSCHHORN AND HANS IRMSCHER
BY
ATTORNEYS

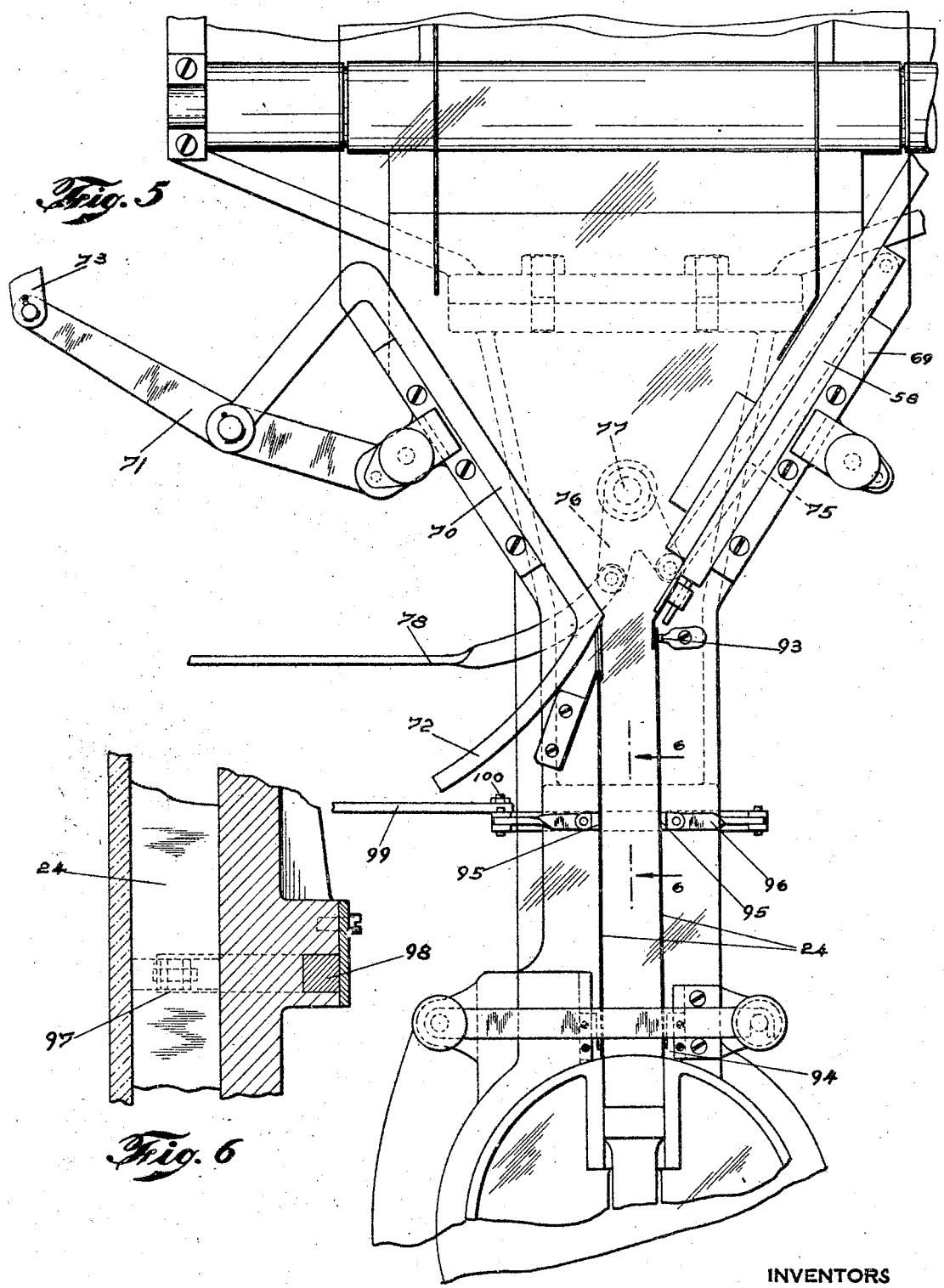

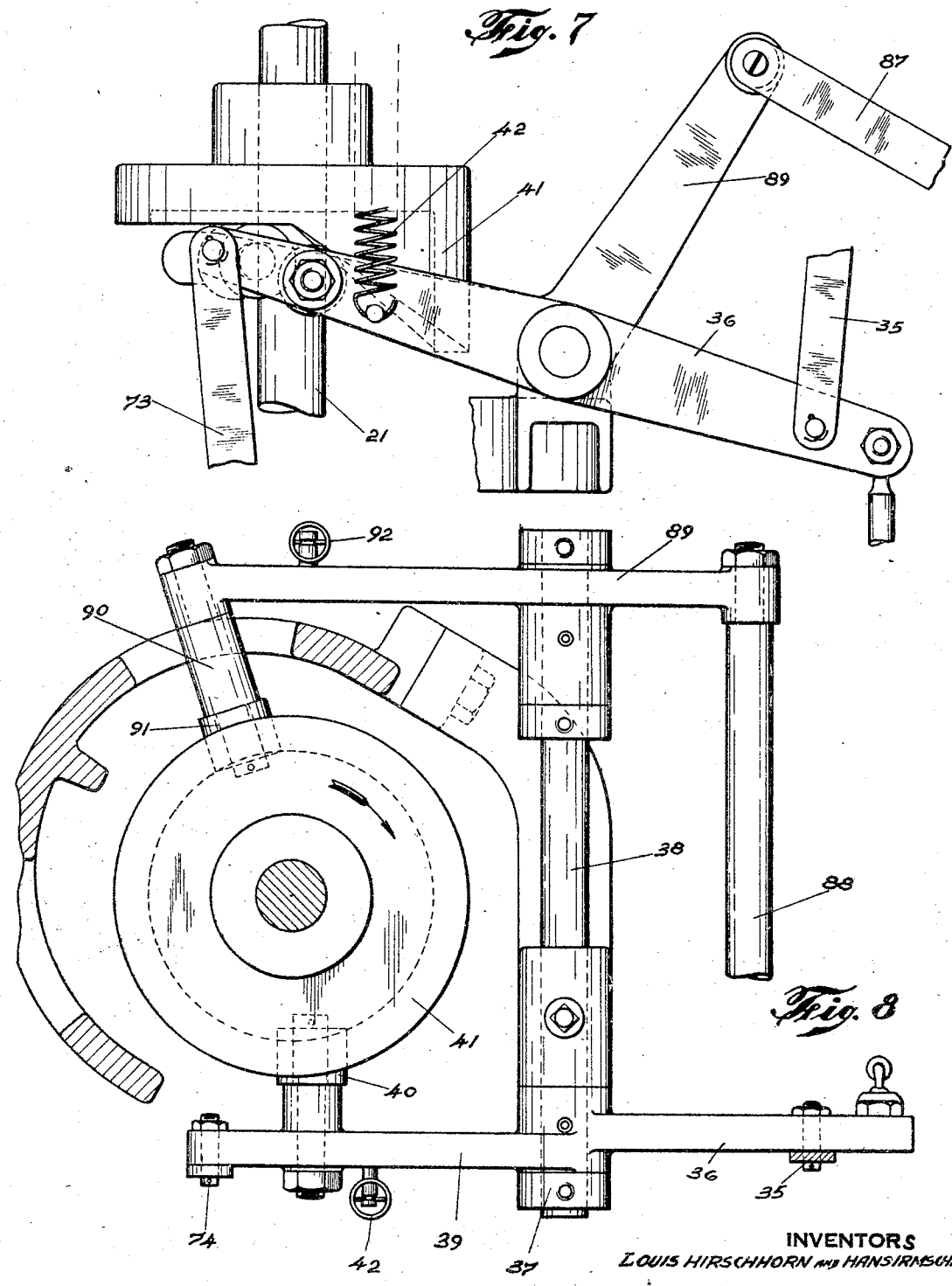

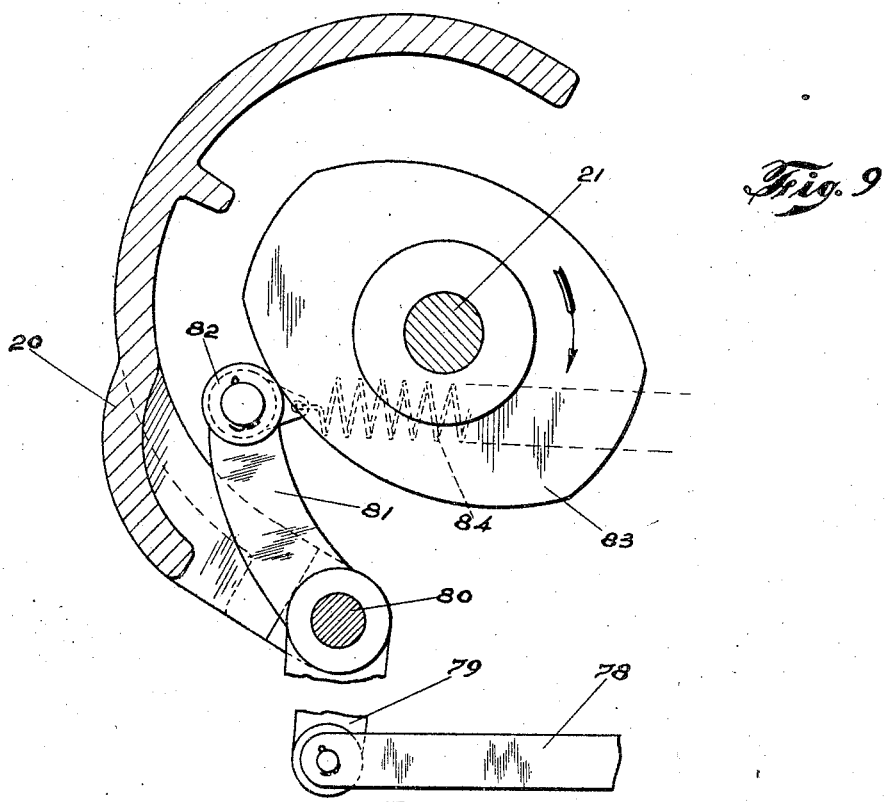
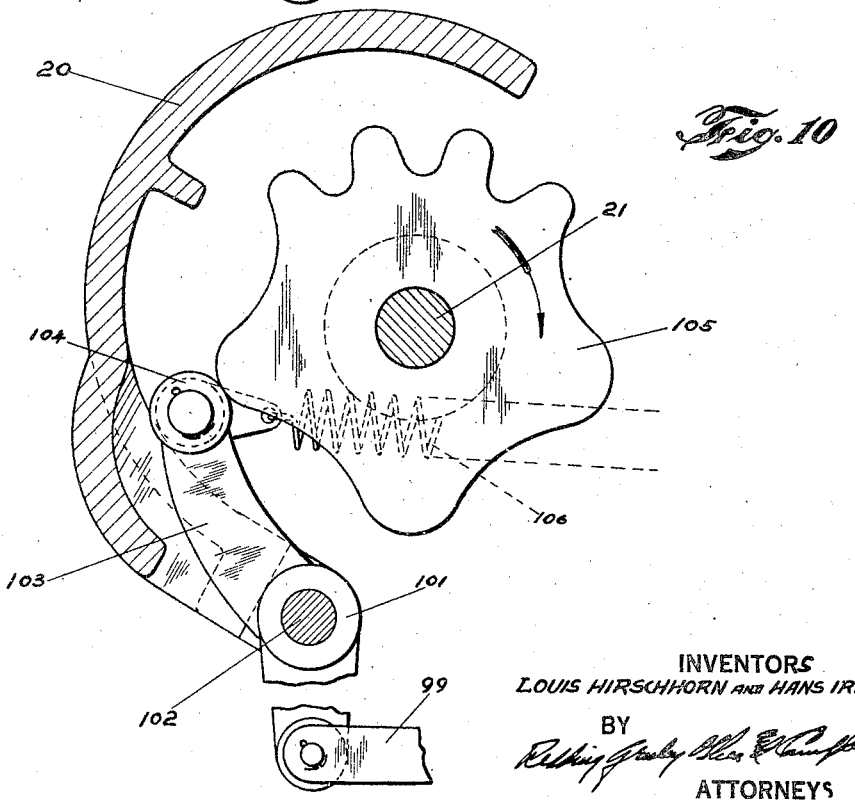

Sept. 24, 1935.  L. HIRSCHHORN ET AL  2,015,071
COMBINATION BAG FILLING MECHANISM
Filed June 24, 1932  9 Sheets-Sheet 7

INVENTORS
LOUIS HIRSCHHORN AND HANS IRMSCHER
BY
ATTORNEYS

Sept. 24, 1935. L. HIRSCHHORN ET AL 2,015,071
COMBINATION BAG FILLING MECHANISM
Filed June 24, 1932 9 Sheets-Sheet 8
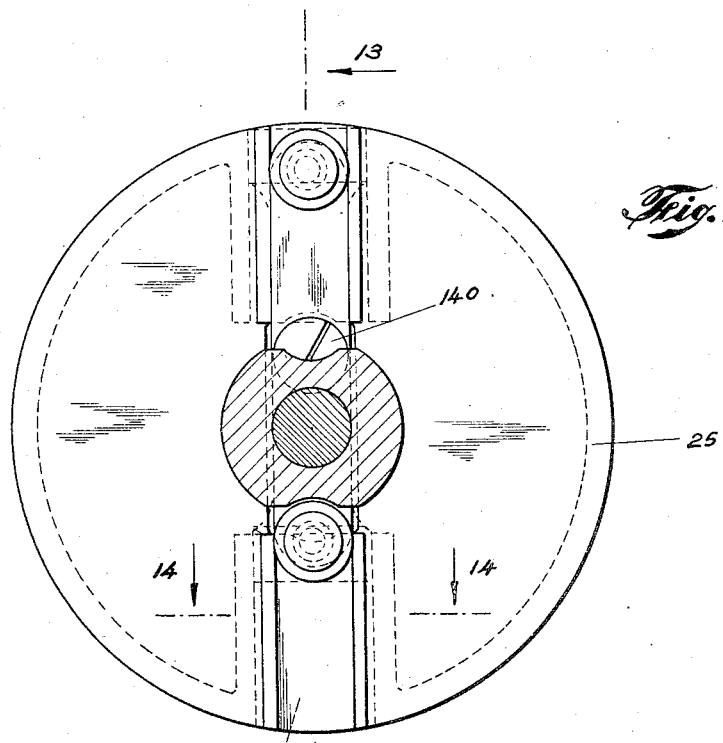
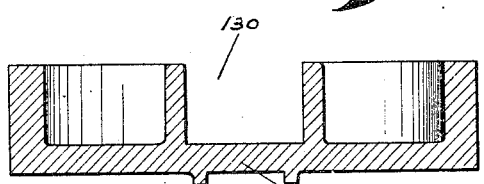
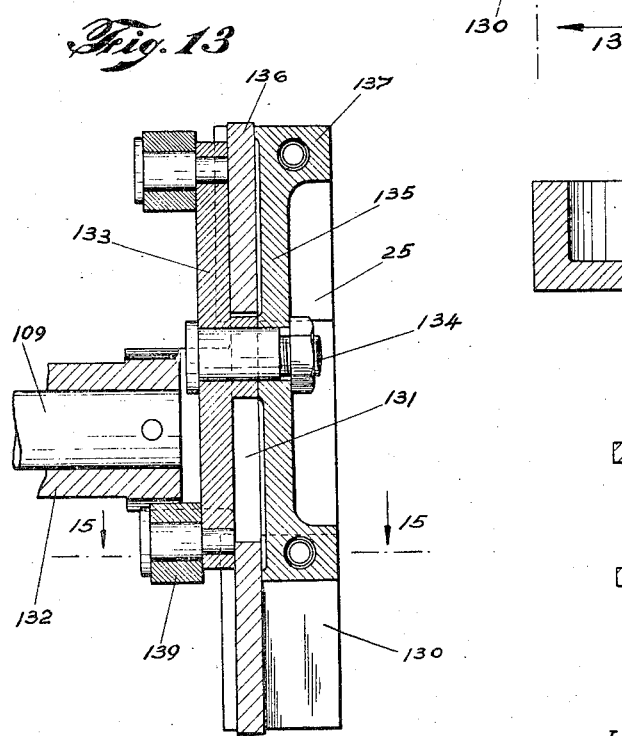
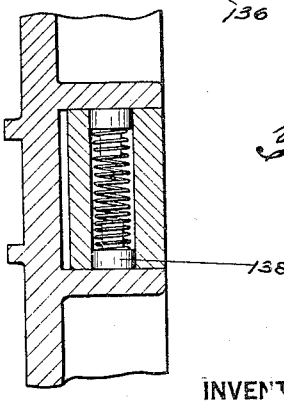
INVENTORS
LOUIS HIRSCHHORN AND HANS IRMSCHER
BY
ATTORNEYS

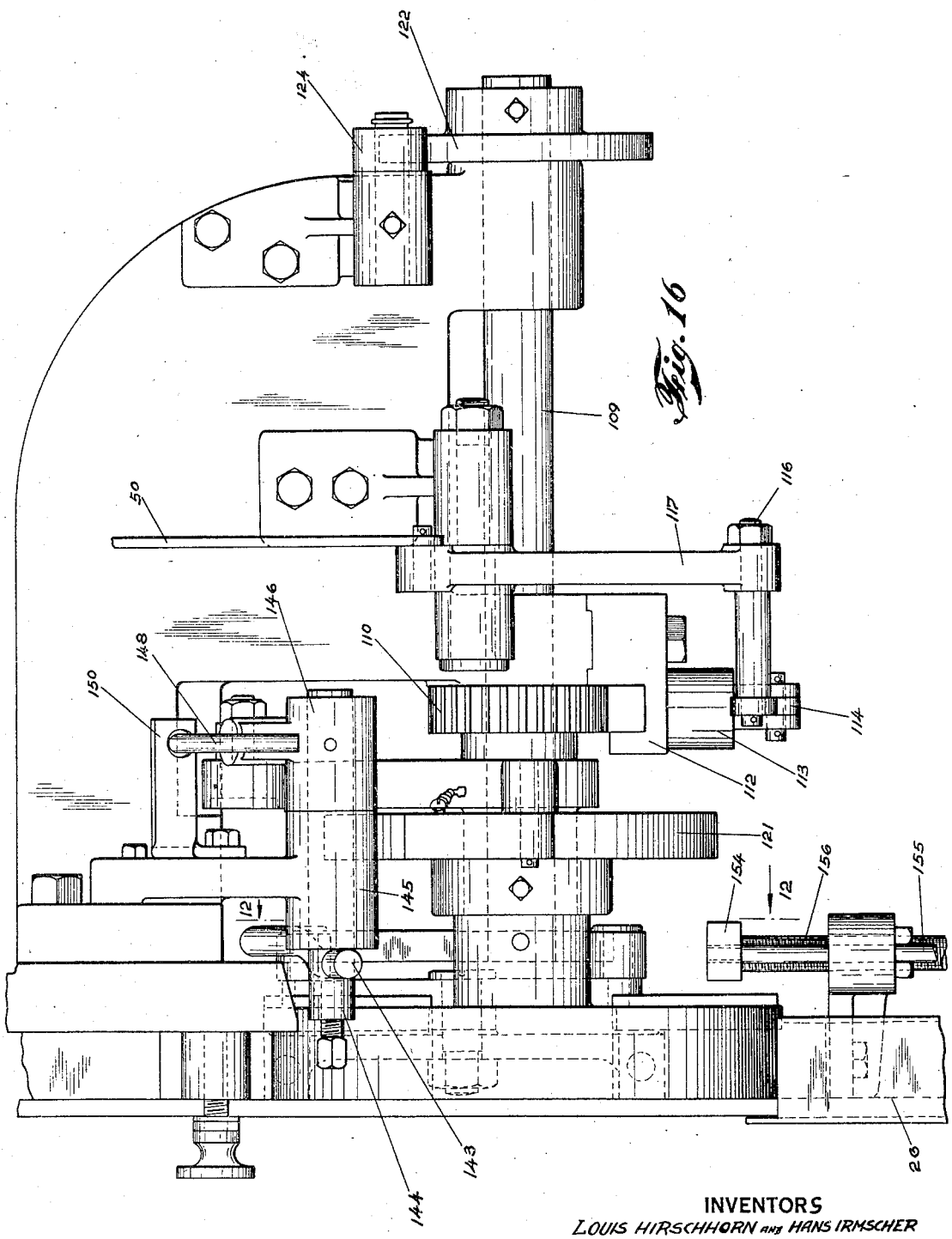

Patented Sept. 24, 1935

2,015,071

UNITED STATES PATENT OFFICE 2,015,071

COMBINATION BAG FILLING MECHANISM

Louis Hirschhorn and Hans Irmscher, New York, N. Y., assignors to Millie Patent Holding Co. Inc., New York, N. Y., a corporation of New York Application June 24, 1932, Serial No. 619,061

3 Claims. (Cl. 221—107)

The present invention relates to devices for filling bag-like receptacles with a substance, such as tea, coffee, etc., and embodies, more specifically, a filling mechanism wherein a measured quantity of a substance is fed from a suitable source to a spout through which the substance is directed into bag-like receptacles.

In handling certain substances, such as tea and the like, where measured quantities thereof must be fed intermittently to a spout or equivalent device, great care must be exercised to prevent the substance from becoming clogged in the receptacles and ducts through which the same passes. In addition to preserving a fluent condition of the substance, it is necessary that the density thereof be uniform during the measuring operation in order that definite quantities thereof may ultimately reach the desired objective. Only in this fashion, can the bagging of tea and the like be successfully accomplished in as much as it is necessary that each bag or receptacle receive a definite quantity of the substance.

Experience has taught that tea is particularly difficult to handle in bagging operations in view of the tendency thereof to become clogged in receptacles and the difficulty of maintaining the same in a fluent condition. In order that substances of this character may be effectively handled during bag filling operations, the present invention has been designed and it is an object thereof to provide an effective mechanism for maintaining tea and similar substances in a fluent condition during a desired operation.

A further object of the invention is to provide a device for handling tea and like substances wherein means is provided for maintaining the substance in a fluent condition and of uniform density during predetermined operations.

A further object of the invention is to provide a mechanism for handling tea and like substances wherein the substance is maintained in a fluent condition and directed through a measuring device for accurately measuring predetermined quantities thereof.

A further object of the invention is to provide a filling mechanism for tea and like substances wherein means is provided for maintaining the substance in a sufficiently fluent condition in a hopper or other receptacle and feeding the same therefrom effectively into a device for directing the substance to a measuring mechanism.

A further object of the invention is to provide a device for directing tea and like substances from a source of supply to a device for directing the same to a measuring mechanism, the last named device having means to maintain a predetermined quantity of the substance therein automatically.

A further object of the invention is to provide a filling device for tea and like substances wherein the substance is maintained in a sufficiently fluent condition in a hopper or other receptacle and fed therefrom into a device for directing the substance to a measuring mechanism, the feeding of the substance into the last named device being controlled automatically by the quantity of substance in such device.

Further objects, not specifically enumerated above, will be apparent as the invention is described in greater detail in connection with the accompanying drawings, wherein:

Figure 2 is an enlarged detail view in side elevation showing the hopper and agitating mechanism of Figure 1.

Figure 3 is a sectional view in side elevation, taken on line 3—3 of Figure 1, and looking in the direction of the arrows, this view illustrating the manner in which the substance is fed from the hopper to a device for directing the same to a measuring mechanism.

Figure 4 is a detail view in side elevation looking from the right in Figure 1, and showing the feed mechanism for controlling the motion of the substance from the hopper.

Figure 5 is an enlarged segmental view in front elevation, showing the apparatus for controlling the feed mechanism of Figure 3.

Figure 6 is a view in section, taken on line 6—6 of Figure 5, and looking in the direction of the arrows.

Figure 7 is a detail view in front elevation, showing the mechanism for actuating the hopper feed and agitating mechanism.

Figure 8 is a plan view of the parts shown in Figure 7.

Figure 9 is a view in section, showing the actuating mechanism for agitating the substance while being directed to the measuring mechanism.

Figure 10 is a view in section showing the device for imparting shaking or shimmying motion to a channel through which the substance is supplied to a measuring mechanism.

Figure 12 is a view in rear elevation, showing a measuring disc constructed in accordance with the present invention.

Figure 13 is a view in section, taken on line 13—13 of Figure 12, and looking in the direction of the arrows.

Figure 14 is a view in section, taken on line 14—14 of Figure 12, and looking in the direction of the arrows.

Figure 15 is a view in section, taken on line 15—15 of Figure 13, and looking in the direction of the arrows.

Figure 16 is a view in side elevation, showing the apparatus for actuating the measuring chamber, this apparatus being shown in rear elevation in Figure 11.

Figure 1:
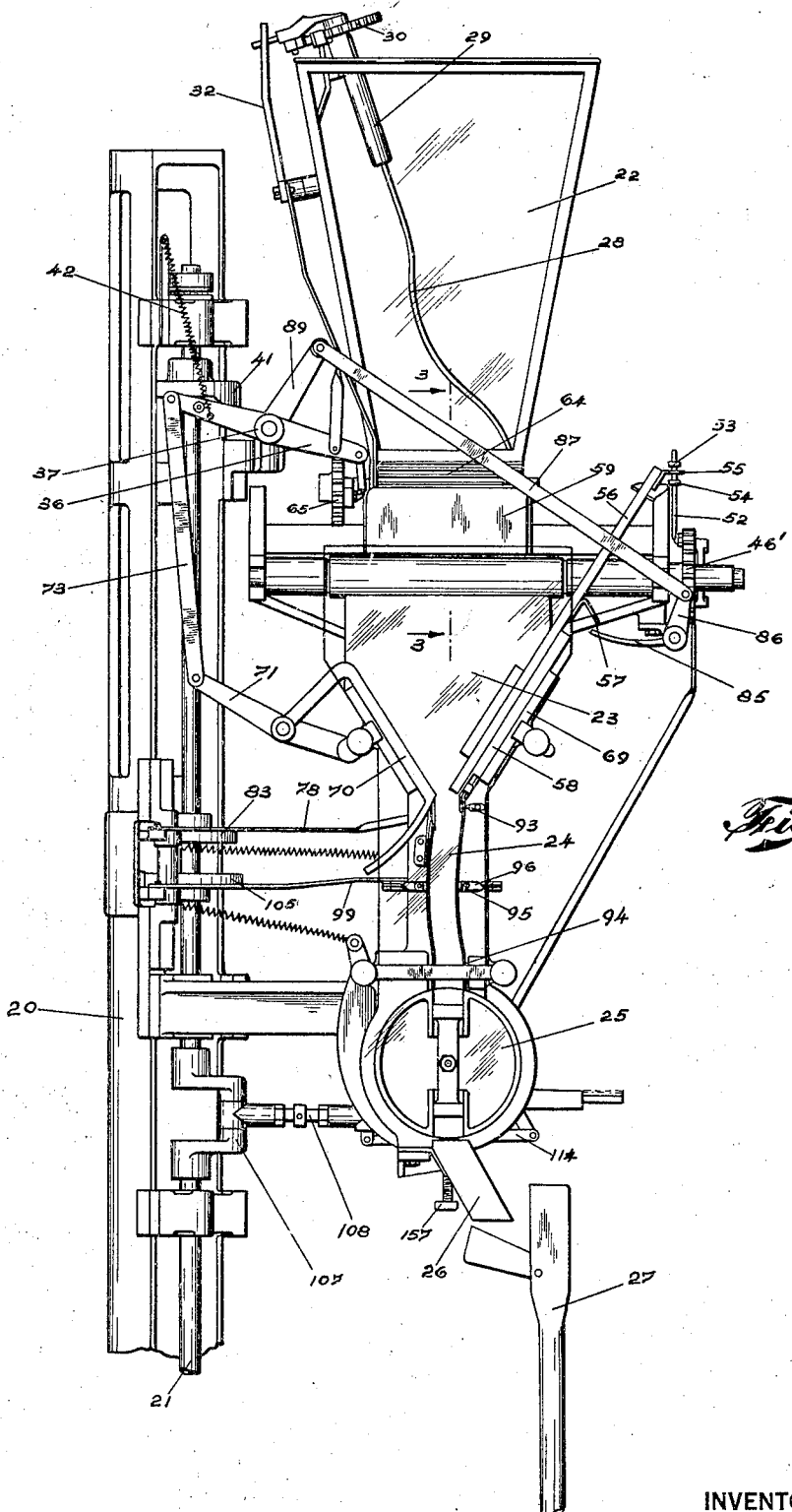
Figure 1 is a view in front elevation, showing a filling mechanism constructed in accordance with the present invention.

With reference to Figure 1, a vertical standard or supporting frame is shown at 20 within which a power shaft 21 is journaled. The frame supports a hopper 22 from which a substance is discharged into an auxiliary hopper 23 and directed into a flexible channel 24. From the channel 24, the substance flows into a measuring mechanism 25 and is discharged into a spout 26 from which the substance is received by a movable spout 27 which directs the substance into bag-like receptacles or other suitable means for treating the substance.

In order that the substance within the hopper 22 may be maintained in a sufficiently fluent condition, an agitating arm 28 is provided therein, the arm being journaled in a sleeve 29 which is secured to the hopper frame. A ratchet wheel 30 (Figure 2) is secured to the arm 28 and is actuated by a pawl 31 which is mounted upon one arm of a bell crank lever 32. A stationary pawl 33 prevents backward motion of the ratchet wheel 30 and reciprocation of crank 32 imparts a step by step rotating motion to the arm 28. The bottom of arm 28 adjacent the outlet of the hopper 22, may be formed as an incomplete loop 34 in order that clogging of the material from the hopper may be effectively prevented.

The bell crank lever 32 is actuated by a link 35 which is connected to a lever 36, journaled at 37 (Figures 7 and 8) and secured to a rock shaft 38. Lever 36 and rock shaft 38 are rocked by an arm 39 upon which a roller 40 is journaled. Roller 40 engages a cam 41 which is so formed as to impart a desired motion to the lever 36 and rock shaft 38, a spring 42 being provided to maintain the roller against the cam.

The base 43 of the hopper is provided with an endless belt conveyor 44 which is mounted upon rollers 45, journaled upon the hopper base at 46. The forward roller 45 is provided with a driving connection to a ratchet wheel 46' (Figures 3 and 4) which is prevented from backward rotation by means of a pawl 47 and driven forwardly by a pawl 48. Pawl 48 is mounted upon a frame 49 which is journaled concentrically with the ratchet wheel 46' and has a rocking motion imparted thereto by means of a link 50 (Figures 4 and 11), the actuation of which will be described in greater detail hereinafter. Rocking motion of the frame 49 is thus transmitted to the ratchet wheel 46' in the form of a step by step forward motion by means of pawl 48 and the feed of the substance from the hopper is controlled by controlling the position of pawl 48. This is accomplished by a measuring bar which rests upon the surface of the substance within the auxiliary hopper 23 and falls therewith until the quantity of substance in the auxiliary hopper has been diminished to a predetermined amount, at which time the pawl 48 is moved into engagement with the ratchet wheel 46 and the feed mechanism including the endless belt 44 is actuated to discharge additional substance into the auxiliary hopper. The structure for accomplishing this automatic feeding of the substance into the auxiliary hopper includes an arm 51 (Figure 4) which is secured to the pawl 48 and pivotally connected to a link 52 which has top and bottom collars 53 and 54 secured thereto. Between collars 53 and 54, the link 52 passes through a recessed flange 55 which is formed upon a measuring rod 56 (Figure 1) which extends within the auxiliary hopper 23. The measuring rod is provided with a flange 57 which is engaged by an arm 85 to cause the measuring rod 56 to be repeatedly lifted in order that it may fall upon the surface of the substance within the hopper 23. In this fashion, the motion of belt 44 is effectively controlled to cause the same to feed substance from hopper 22 at a predetermined rate in accordance with the diminishing supply of the substance within auxiliary hopper 23. The dotted lines of Figure 4 indicate the position of the driving elements preparatory to imparting a forward rotation to the ratchet wheel 46 in order that additional substance may be fed from the belt 44 into the auxiliary hopper 23.

In certain instances, very stiff and bulky tea is found to clog in falling from the endless belt 44. Quantities of the substance thus accumulate at the end of the belt and do not fall into the auxiliary hopper 23. To overcome this condition a breaker plate 59 (Figure 3) is mounted to slide vertically and is reciprocated by means of an arm 60 which is secured to a shaft 61, upon which a crank arm 62 (Figure 2) is secured and actuated by a link 63 which is pivoted to an arm of the bell crank lever 32.

At the bottom of the hopper 22 a cylindrical toothed member 64 is journaled, the teeth of this member extending into the hopper base and directing the substance downwardly through the hopper base and upon the belt 44. This toothed member partakes of a step by step rotational motion by means of a ratchet wheel 65 (Figure 2) which is actuated by a pawl 66, mounted upon an arm 67 which is journaled concentrically with the cylinder 64. Arm 67 is actuated by a link 68 which is pivotally connected to lever 36 as seen in Figure 1.

The auxiliary hopper 23 is provided with converging bottom walls formed by a slidable bar 58 which rests upon a backing plate 69 and a swinging bar 70 which is secured to a lever 71 (Figures 1 and 5). The bottom of the swinging bar 70 is formed with an arcuate extension 72 which is so curved that the bottom of the extension moves in a circular path. When the arms 70 swings upwardly into the auxiliary hopper 23, the substance cannot escape from the hopper and upper portion of channel 24 because the arcuate extension 72 moves into position to close the same effectively. Arm 71 is actuated by a link 73 (Figure 1) which is connected to arm 39 at 74. The arm 70 is thus swung back and forth in accordance with the movement of arm 39.

The slidable bar 58 is actuated by a link 75 which is pivoted to a bell crank lever 76 (Figure 5), journaled at 77 and actuated by a link 78 which is pivoted to an arm 79 of a bell crank lever journaled at 80 (Figure 9). The bell crank lever is provided with an arm 81 upon which a roller 82 is journaled, the roller engaging a cam 83 which is secured to the power shaft 21. A spring 84 maintains the roller 82 against the periphery of cam 83 and the bar 58 is thus slidably moved back and forth upon the supporting plate 69.

Arm 85 partakes of swinging motion and is mounted to move with a lever 86 which is actuated by a link 87. Link 87 is connected to a rod 88 (Figures 7 and 8) which is secured to one end of a bell crank lever 89 journaled upon shaft 38. The other end of the bell crank lever is provided with an arm 90 upon which a roller 91 is journaled, roller 91 being urged against the bottom of cam 41 by means of a spring 92. The channel 24 is anchored at its top and bottom ends at 93 and 94, respectively. Intermediate its ends, the channel is engaged by spaced arms 95 which are mounted upon links 96, connected to the ends 97, of a U-shaped slide bar. The intermediate or connecting portion 98 of the U-shaped slide bar is slidably mounted within the frame and reciprocated by means of a link 99 which is pivoted thereto at 100. The other end of link 99 is connected to one arm of a bell crank lever 101 (Figure 10) which is journaled at 102 upon the frame of the machine. The other arm 103 of the bell crank lever is provided with a roller 104 which is adapted to engage a cam 105 secured to the drive shaft 21. The periphery of cam 105 is irregular in contour and is thus adapted to impart a shaking or shimmying motion to the channel 24, the roller 104 being maintained against the surface of cam 105 by means of a spring 106.

Figure 11:
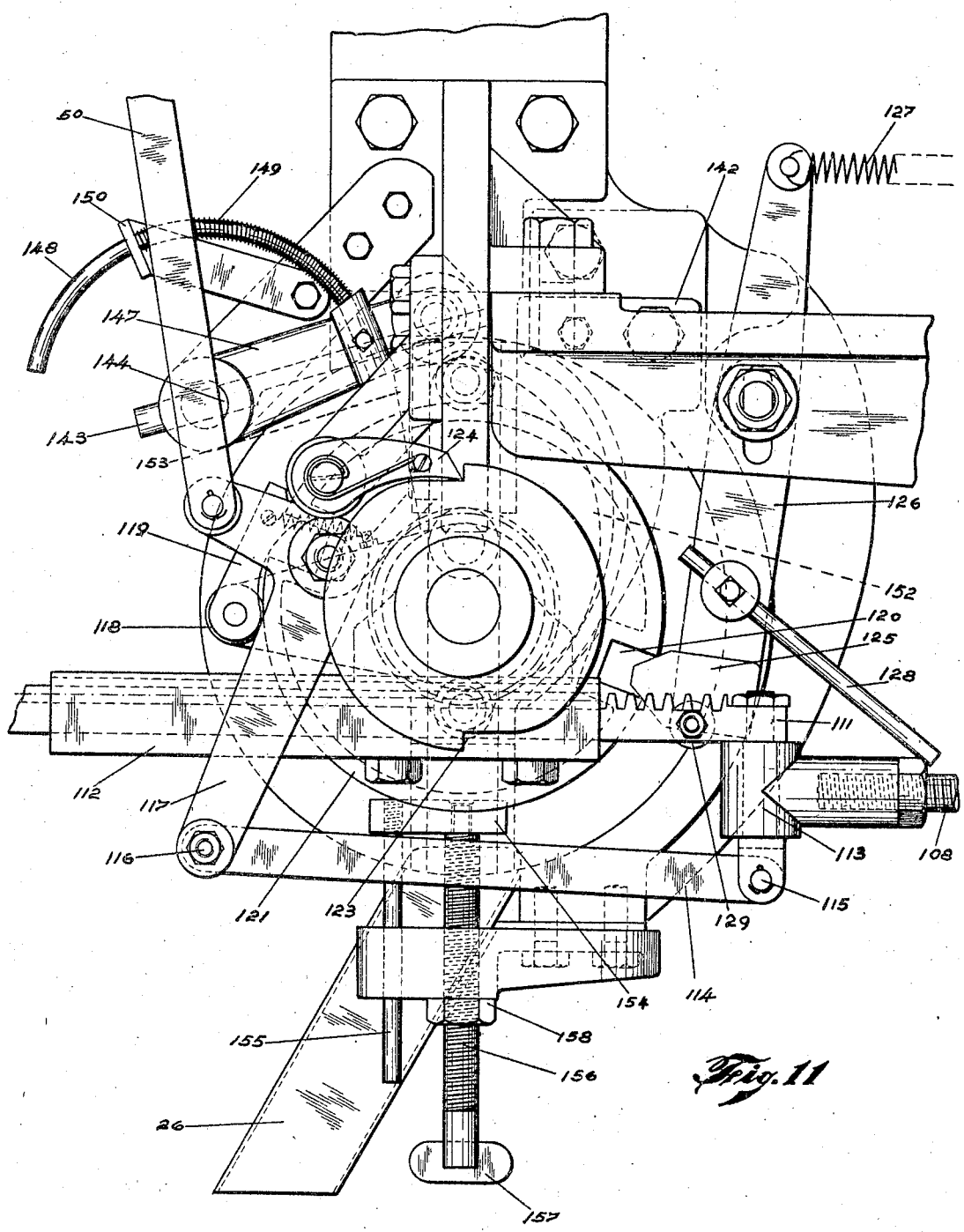
Figure 11 is a view in rear elevation, showing the apparatus for actuating the measuring mechanism.

From the flexible channel 24, the substance falls into the chambers formed in a measuring disc 25, this disc being rotated by a mechanism which is illustrated in detail in Figures 11 and 16. The disc rotating member derives power from a crank 107 on the power shaft 121 through a connecting rod 108 (Figure 1). Measuring disc 25 is secured to a shaft 109 upon which a gear 110 is journaled. A rack 111 is mounted slidably in a stationary guide 112 which is formed on the frame of the machine and connecting rod 108 is connected with rack 111, through a pivot connection 113. Reciprocating motion is thus imparted to rack 111 and gear 110.

Simultaneously with the actuation of rack 111 connecting rod 108 actuates link 50 by means of a link 114 which is pivoted at 115 to the connection 113 and at 116 to an arm of a bell crank lever 117. The other arm of lever 117 is pivoted to the adjacent end of link 50, thus effecting the actuation of the pawl 48 as presently described.

Mounted to rotate with gear 110 is an arm 118 upon which a spring-pressed pawl 119 is pivoted. Pawl 119 engages diametrically spaced notches 120 in a disc 121, disc 121 being secured to shaft 109. A disc 122 is secured to the end of shaft 109 and formed with diametrically spaced teeth 123 which are adapted to be engaged by a spring-pressed pawl 124 to prevent backward motion of shaft 109.

Disc 121 and shaft 109 are securely held in correct position during reverse travel of pawl 119 by means of a locking dog 125. This dog is mounted upon a lever 126 and urged into engagement with the periphery of disc 121 and notches 120 by means of a spring 127. An arm 128 is secured to lever 126 and is engaged by a roller 129 upon rack 111 to disengage the locking member 125 during motion of the rack to the right, as viewed in Figure 11. In this fashion, disc 25 is accurately rotated in a step by step motion to turn the same through 180° and thus effect the measuring and discharge of a given quantity of substance as described hereinafter.

As will be seen from an inspection of Figures 12 through 15, the measuring disc 25 is formed with diametrically opposed recesses 130 and a central slot 131, the axis of which passes through the axis of the disc 25. Shaft 109 is secured to a collar or hub 132 upon which disc 25 is mounted, slot 131 extending into the hub 132 in order that a slide bar 133 may move therein. Slide bar 133 is mounted upon a shaft 134 upon which is mounted a measuring bar 135, slide bar 133 and measuring bar 135 being separated by a central web 136 of disc 25. Bars 133 and 135 thus move as a unit and the ends of measuring bar 135 are enlarged at 137 to form the bottom of measuring recesses defined by the notches 130. Spring-pressed friction shoes 138 are mounted within the enlarged heads 137 and bear outwardly against the sides of notches 130 to resist sliding motion of the measuring bar 135. When the measuring disc is in the position shown in Figure 1, the position of the measuring bar and its upper enlarged extremity 137 thus determines the size of the measuring chamber for a given operation, the substance falling into such chamber when the measuring bar 135 is lowered, after the corresponding notch 130 in the disc 25 has been aligned with channel 134. The motion of the measuring bar 135 and slide bar 133 is controlled by rollers 139 which are mounted upon the opposite ends of bar 133. Hub 132 is formed with recesses 140 which receive the rollers 139 and permit a desired degree of motion of the bar 133.

As a recess 130 of the disc 25 approaches alignment with the channel 24, the corresponding enlarged end of measuring bar 135 is elevated by the engagement of a cam 141 with the roller corresponding to the opposite end of the measuring bar 135. This curved cam track will be seen in dotted lines in Figure 11 and is formed as an extension of a bracket 142 upon the frame of the machine. The top of the enlarged portion of measuring bar 135 corresponding to the aligned notch 130 thus lies flush with the periphery of the measuring disc 25 at such time and prevents the falling of substance from the channel 24 into the corresponding notch or measuring recess. In order that the measuring bar may move downwardly and permit the desired quantity of substance to be received within the measuring chamber or notch, an arm 143 is provided, being suitably actuated to engage the upper roller 139 and force the measuring bar 135 downwardly with the substance entering the measuring chamber. Arm 143 is mounted upon a shaft 144 which is journaled within a bearing 145 upon the frame of the machine. Shaft 144 is provided with a collar 146 upon which an arm 147 is secured. Arm 147 is provided with an arcuate guide 148 over which a spring 149 is mounted to urge the arm 147 normally in a clockwise direction, as viewed in Figure 11.

Spring 149 seats against a bracket 150 upon the frame of the machine and causes a roller 151 upon arm 47 to be urged into engagement with the periphery of a cam 152. Cam 152 moves with the notched disc 121 and is provided with a shoulder 153 which permits roller 151 to fall when the corresponding measuring chamber is aligned with the channel 24. Spring 149 thus causes the measuring bar to fall and permits a desired quantity of substance to be received within the measuring chamber.

The extent of movement of the measuring bar thus determines the quantity of substance received within the measuring chamber. In order that the extent of movement may be varied, a stop plate 154 is provided against which the lower roller 139 is moved by the arm 143 in its engagement with the upper roller 139. Stop plate 154 is mounted upon a guide rod 155 and its position is adjustable vertically by means of a threaded rod 156 having a manually operable member 157 and a lock nut 158.

It will thus be seen that a mechanism has been provided for maintaining tea or like substances in a sufficiently fluent and uniformly dense condition to enable the same to be accurately measured and discharged in desired quantities. The invention includes an effective measuring device whereby desired quantities of a fluent substance may be successively directed to a spout or other means for receiving the quantities and, while the invention has been described with specific reference to the accompanying drawings, it is not to be limited, save as defined in the appended claims.

We claim as our invention:

1. A measuring device comprising a rotatable member formed with diametrically spaced chambers, a bar having heads formed at the ends thereof and mounted slidably in the chambers, means to rotate the member into a receiving position, positive means to move a head to the outer end of its chamber before the said chamber is positioned in its receiving position, means to lock the member in a receiving position, and positive means to move the said head into the chamber to a predetermined position while the said respective chamber remains in the said receiving position.

2. A measuring device comprising a rotatable member formed with diametrically spaced chambers, a bar having heads formed at the ends thereof and mounted slidably in the chambers, means to rotate the member into a receiving position for each chamber, a rod on the bar and parallel therewith having rollers at the ends thereof, a cam adapted to engage the rollers to move the heads to the outer ends of the respective chambers as the said respective chambers are moved into receiving position, an arm adapted to engage the rollers to move the heads into the respective chambers after the said respective chambers have been moved into receiving positions, and means to actuate the last named arm.

3. A measuring device comprising a rotatable member formed with diametrically spaced chambers, a bar having heads formed at the ends thereof and mounted slidably in the chambers, means to rotate the member into a receiving position for each chamber, a rod on the bar and parallel therewith having rollers at the ends thereof, a cam adapted to engage the rollers to move the heads to the outer ends of the respective chambers as the said respective chambers are moved into receiving positions, an arm adapted to engage the rollers to move the heads into the respective chambers after the said respective chambers have been moved into receiving positions, an arm and roller mounted with the last named arm, a cam movable with the member and adapted to cause the measuring bar to be moved after a chamber has been moved to a receiving position, and a spring to urge the last named roller against the last named cam.

LOUIS HIRSCHHORN.
HANS IRMSCHER.